INVENTOR.
Milton N. Weber
BY
Barnes, Kisselle, Laughlin & Raisch
Attorneys.

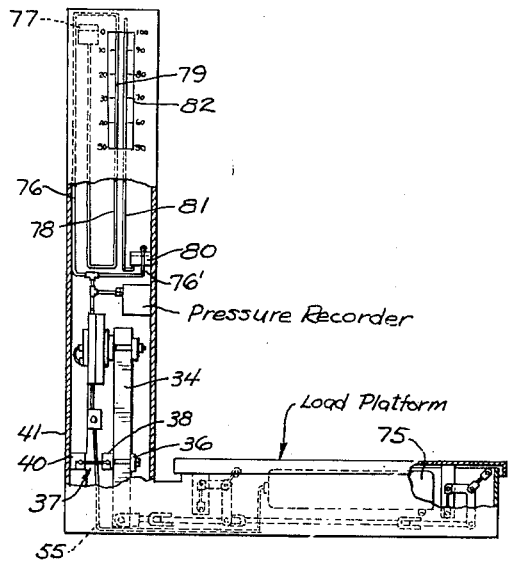
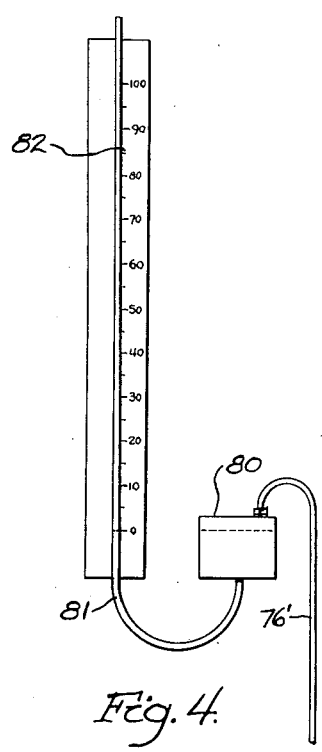
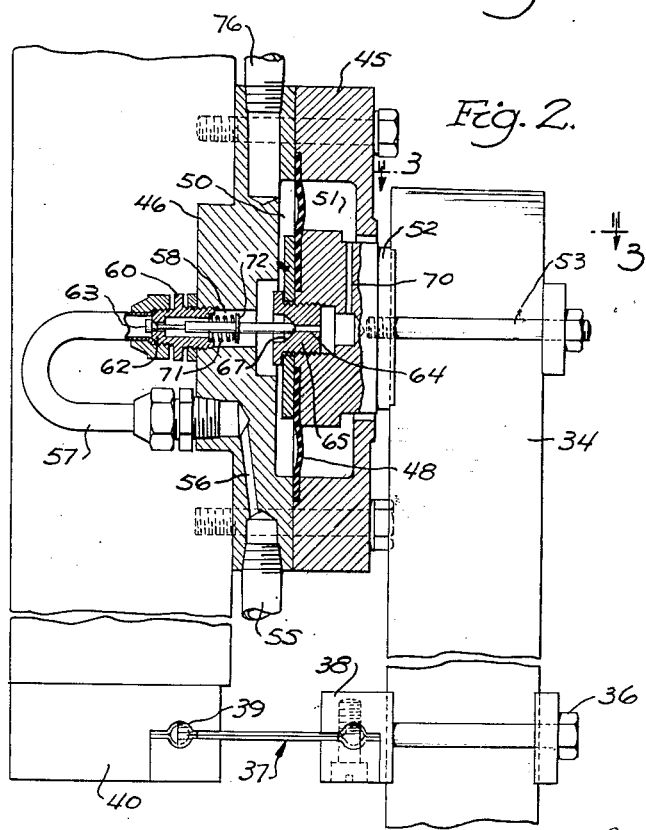
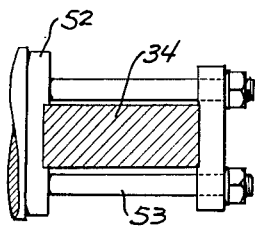
Fig. 1.
Fig. 2.
Fig. 3.
Fig. 4.
INVENTOR.
Milton N. Weber April 14, 1953  M. N. WEBER  2,634,968
SCALE WITH A MINIMUM OF PLATFORM MOVEMENT
Filed June 29, 1949  2 SHEETS—SHEET 2

Patented Apr. 14, 1953

2,634,968

UNITED STATES PATENT OFFICE 2,634,968

SCALE WITH A MINIMUM OF PLATFORM MOVEMENT

Milton N. Weber, Detroit, Mich., assignor of one-half to Herbert W. Link, Detroit, Mich.

Application June 29, 1949, Serial No. 102,072

5 Claims. (Cl. 265—71)

This invention relates to a load measuring device and may be employed for measuring gravity load such as the weight of objects and therefore is conveniently termed a scale.

The objects of the invention are to provide a scale wherein the load receiving element, such as the platform, has such a small movement when a load is placed thereon that there is practically no friction or wearing surfaces in the structure. In accordance with the invention the load encountered is resisted by fluid pressure and the very slight movement of the platform is substantially unvarying regardless of the load placed thereon. The invention also has to do with and aims to provide a novel floating platform mounting. Further in accordance with the invention the weight of the load is ascertained by gauging the fluid pressure required to balance the load.

A structure made in accordance with the invention is shown in the accompanying drawings:

Fig. 1 is a general view with some parts cut away and some parts in section showing a scale constructed in accordance with the invention.

Fig. 2 is an enlarged cross sectional view of the fluid actuated balancing device.

Fig. 3 is a sectional view taken substantially on line 3—3 of Fig. 2 showing the connection to the actuating arm.

Fig. 4 is a diagrammatic view of a gauge and more specifically a manometer.

Figure 6:
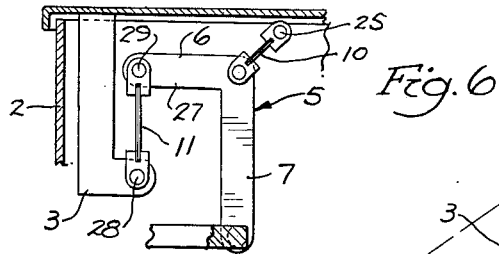
Fig. 6 is a detailed view of one of the lever arrangements for mounting the platform.
Figure 5:
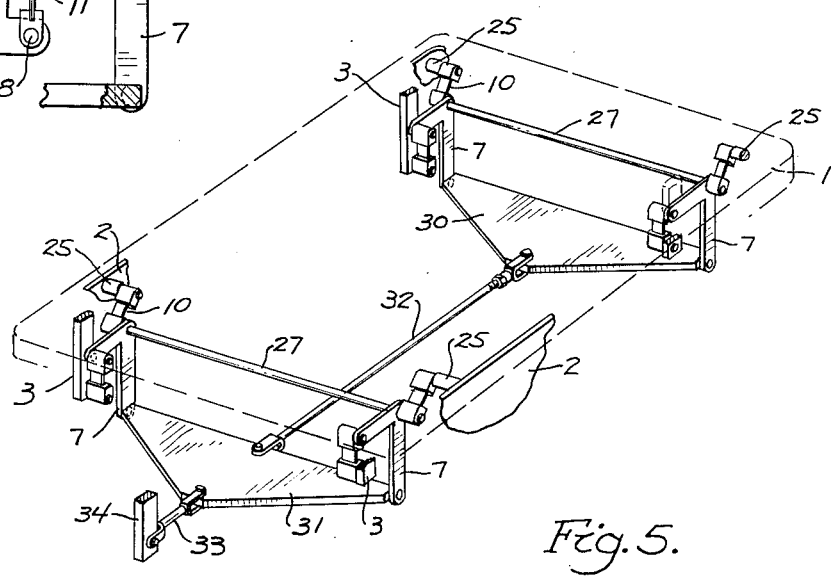
Fig. 5 is a perspective view with parts cut away and some parts in dotted lines showing the platform mounting.

Reference should probably be made first to Figs. 5 and 6 wherein a platform 1 is mounted in a floating manner with a lever system at each corner thereof. The platform may be mounted to overlie suitable frame or housing 2 and at each corner the platform has a depending projection 3. There is a bell crank type of lever generally illustrated at 5 with an arm 6 positioned generally horizontally and an arm 7 positioned generally vertically. This lever is mounted in a floating manner by a tension link generally shown at 10 while the projection 3 is mounted to the arm 6 by a tension link generally shown at 11.

Figure 7:
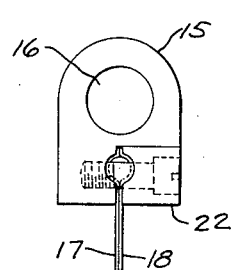
Fig. 7 is an enlarged view of one of the tension mounting elements.
Figure 8:
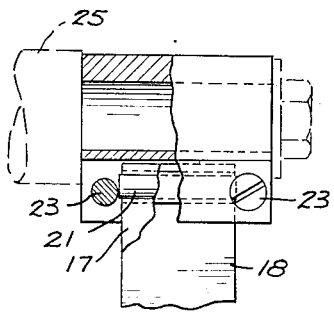
Fig. 8 is a view partly in section and with parts broken away illustrating the structure of one of the tension elements.
Figure 9:
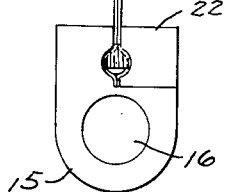
Fig. 9 is a detailed view of one of the flexible members of the tension elements.
Figure 9:

The details of the tension links are similar and are shown in Figs. 7, 8 and 9.

The link shown in Fig. 7 has an end bearing member 15 with an aperture 16 therein and a like bearing member with the same reference characters applied is at the other end of the link. The connecting elements are of flexible sheet metal construction or similar construction and two of such elements are shown at 17 and 18. The end of each element is formed with an approximately half circular form portion 20. Two of such elements are placed together and a pin 21 is disposed within the facing recesses of the portion 20. This forms a bulbous end formation which is engaged in a similarly fashioned recess structure in the end piece 15 and in a block 22 secured to the end piece as by means of cap screws 23.

The frame 2 is formed with studs 25 adjacent each corner of the platform, each for receiving one of the tension links 10. A rod 27 extending transversely of the platform has its ends received in the opposite ends of the tension links. There is a rod 27 for each two bell cranks and the bell cranks are mounted on the rods as shown. The tension links 11 are similarly connected to the projection 3 and to the portion 6 of the bell crank by studs 28 and 29.

A connector member or plate 30 joins the lower ends of two of the arms 7, and a similar connector member 31 connects the arms 7 of the other two bell cranks, as shown in Fig. 5. These two connector members are joined together by a tension rod 32. A tension rod 33 is connected to the connector member 31 and it, in turn, is connected to an actuator lever 34.

Now, it will be observed by considering Figs. 5 and 6 that if a load is placed upon the platform 1, this load is transmitted through the tension links 11 to the bell cranks 5. The bell cranks tend to turn on their cross shafts 27, the direction of tendency of rotation being counterclockwise, as Fig. 6 is viewed, and since the bell cranks are tied together as a unit by the plates 30 and 31 and the tension rod 32 the movement is resisted by the tension rod 33 and the lever 34. The resultant forces on the links 10 are tension forces and the links 10 are so positioned as to be substantially in line in the direction of the forces. All of the connections for the parts including the connections at the ends of the tension links and the mounting for the bell crank levers and the connections between the plates 30 and 31 and the bell crank levers are pivotal in nature in that some pivoting or oscillation may take place. This eliminates any binding tendency, Moreover, the flexibility of the tension links further provide for a non-binding freely floating mounting for the platform.

The lever 34 is a strong bar of steel preferably substantially unyieldable under the uses to which it is to be put and it is provided with a clamp 36. A flexible link 37 constitutes a fulcrum. This link may be similar to the one shown in Fig. 7 with one end, as at 38, tightly gripped in the clamp 36 and its other end as at 39 securely mounted in a holder 40, which may be mounted on part of the frame or post as illustrated at 41 (Fig. 1). The lever arm projects upwardly from its fulcrum as shown in Figs. 1 and 2, and near its upper end is associated with a fluid pressure balancing unit.

This unit, as shown in Fig. 2, has a housing constituted by a housing element 45 and a housing element 46 with a diaphragm 48 providing a chamber 50 on one side thereof and a chamber 51 on the opposite side thereof. A plug 52 is securely fastened to the lever 34 as by means of clamp means 53 and this plug is freely movable through an aperture in the housing part 45 with clearance. The result is that the chamber 51 is open to the atmosphere. A supply line for fluid under pressure, such as compressed air, is connected to the housing as at 55 and there is a passage 56 which, by couplings as shown, and a tube 57 connects to passage 58 which leads to the chamber 50. Valve means are provided; this valve means includes a coupling member 60 which provides a valve seat 62 for a valve 63. The stem of this valve extends through passage 58 and its end seats and constitutes a valve with a port 64 in a fitting 65 secured in the plug 52. The port 64 has a valve seat 67 for the valve stem. The port 64 communicates with the chamber 51 through a small passage 70. A small spring 71 acts upon the valve stem and it normally keeps the valve 63 closed. The spring reacts against the fitting 60 and acts upon a washer 72 on the valve stem.

Air under pressure is provided from a suitable source and where the device is constructed somewhat after the manner of a scale, as shown in Fig. 1, air under pressure is supplied to an air reservoir 75 which may be located under the platform and the pressure line 55 extends therefrom to the balancing device as indicated. Leading from the chamber 50 is an air pressure line 76 and this extends to a suitable gauge such as a manometer. A reverse tube type of manometer is indicated in Fig. 1, with the line 76 connecting into one of the upper ends of the tube, while at the other end of the tube is a reservoir tank 77. The manometer tube is indicated at 78 and suitable indicia 79 is employed for reading purposes. The reverse manometer may be used in conjunction with a simple form of manometer of the type shown in Fig. 4. For this purpose a branch of the pressure line 76, as indicated at 76', connects into a closed reservoir 80 and the pressure applied to the surface of mercury or suitable fluid in the reservoir displaces the fluid upwardly into tube 81 and the height may be read by a scale 82. By positioning the manometer tubes and scale as shown, one registers throughout a low range and the other throughout a high range and thus the overall height of the gauge is lessened. Suffice it to say, that a manometer is one form of pressure gauge.

As set forth above, the movements embodied in this scale are minimized. If a load is placed on the platform, the platform is depressed somewhat. This may be in the nature of about .005 of an inch. The tension rod 33 tends to pull the lower end of the lever 34 as it is viewed in Fig. 1, and the lever pivots or has a pivotal movement caused by the flexing of the link 37. There is no journal pivot. To the contrary, the strip-like elements of the link 37 merely flex. In this case the lever 34 is acting as a lever of the first order and its upper end shifts slightly to the left as Figs. 1 and 2 are viewed. The result is that the valve stem in its seat 67 is shifted to the left against the light spring 71 and the valve 63 is opened. Air under pressure enters and acts upon the diaphragm and when the pressure in the chamber 50 has returned the plug 52 to a balanced condition, the parts are then at rest, and they stay at rest. This pressure is then read at the gauge which can easily be translated to pounds or other units of measure, and, indeed, the indicia thereon may indicate units of weight. In the event of a slight overmovement of the diaphragm and plug 52 the port 64 is open and the pressure in the chamber 50 is relieved by exhaust to the atmosphere. When the load is removed from the platform the air pressure and chamber 50 shifts the block and diaphragm to the right as Fig. 2 is viewed, thus opening port 64 for the discharge of air and when the balanced condition is again attained the diaphragm and plug move back to the position shown and the port 64 is closed.

It takes only a slight movement to displace the diaphragm and this movement can be effected by a very light load on the platform or a very heavy load. The displacement of the platform is about the same regardless of the weight of the load placed thereon. The platform is at all times held in a floating manner. The movement is so slight that no wearing parts are involved and no binding can occur because of the flexible linkage.

I claim:

1. In a scale having a load receiving platform and fluid pressure means for balancing the platform including means for gauging the fluid pressure and wherein the movement of the platform under load is at a minimum and substantially unvarying regardless of the load, a suspension system for the platform comprising a plurality of units for supporting the platform at a plurality of locations, each unit constituted by a lever having a bend in its midportion, a support, a link connected to the support and connected to the lever intermediate its ends substantially at the bend in the midportion, a second link for connecting the platform and one end of said lever, means connecting the other end of said lever with the corresponding ends of the levers of the other units, and load transmitting means connecting the last named means and the fluid pressure means.

2. In a scale having a load receiving platform and fluid pressure means for balancing the platform including means for gauging the fluid pressure and wherein the movement of the platform under load is at a minimum and substantially unvarying regardless of the load, a suspension system for the platform comprising a plurality of units for supporting the platform at a plurality of locations, each unit constituted by a lever having a bend in its midportion with a substantially horizontally extending arm and a substantially vertically extending arm, a support, a link connected to the support and connected to the midportion of said lever substantially at the bend therein, a second link connected to and for suspending the platform from the horizontal arm of said lever, means connecting the substantially vertical arm of said lever to the corresponding arms of the levers of other units, and load transmitting means connected to said last named means and to the fluid pressure means.

3. In a scale having a load receiving platform and fluid pressure means for balancing the platform including means for gauging the fluid pressure and wherein the movement of the platform under load is at a minimum and substantially unvarying regardless of the load, a suspension system for the platform comprising a plurality of units for supporting the platform at a plurality of locations, each unit constituted by a lever having a bend in its midportion, a support, a link connected to the support and connected to the lever at the bend therein, a second link for connecting the platform and one end of said lever, means connecting the other end of said lever with the corresponding ends of the levers of the other units, and load transmitting means connecting the last named means and the fluid pressure means, the first named link of each unit being positioned at an angle to both the arms of said levers and disposed in the direction of the forces applied thereto.

4. In a scale having a load receiving platform and fluid pressure means for balancing the platform including means for gauging the fluid pressure and wherein the movement of the platform under load is at a minimum and substantially unvarying regardless of the load, a suspension system for the platform comprising four suspension units arranged so as to define the corners of a parallelogram, each unit constituted by a lever having a bend in its mid-portion, a substantially horizontal arm and a substantially vertical arm, a support, a flexible link connected to the support and connected to the lever intermediate its end, a second flexible link connected to the horizontal arm of the lever and connected to the platform for suspending the platform, a cross member between each two of the units for connecting the vertical arms of their levers, means connecting the two cross members together and load transmitting means connected to one of said cross members and to the fluid pressure means, said load transmitting means extending substantially horizontally in the same direction as the extent of the horizontal arms of the said levers, whereby the first said links are placed under tension by load on the platform, said first named links being disposed angularly relative to the horizontal and vertical and substantially parallel to the tension thereon.

5. The scale structure as substantially described in claim 4 characterized in that the flexible links have pivotal connections at their ends.

MILTON N. WEBER.

References Cited in the file of this patent

UNITED STATES PATENTS

| Number | Name | Date |
|---|---|---|
| 175,248 | Hitchcock | Mar. 28, 1876 |
| 252,627 | Selleck | Jan. 24, 1882 |
| 445,269 | Clawson | Jan. 27, 1891 |
| 1,411,211 | Hapgood | Mar. 28, 1922 |
| 1,528,976 | Guelbaum | Mar. 10, 1925 |
| 1,895,502 | Vernet | Jan. 31, 1933 |
| 2,013,810 | Shimek | Sept. 10, 1935 |
| 2,359,236 | Moore | Sept. 26, 1944 |